United States Patent
Gebregergis et al.

(10) Patent No.: US 9,143,081 B2
(45) Date of Patent: Sep. 22, 2015

(54) MOTOR CONTROL SYSTEM HAVING BANDWIDTH COMPENSATION

(71) Applicants: Abraham Gebregergis, Saginaw, MI (US); Ramakrishnan RajaVenkitasubramony, Saginaw, MI (US); Tomy Sebastian, Saginaw, MI (US); Niharika P. Popy, Saginaw, MI (US)

(72) Inventors: Abraham Gebregergis, Saginaw, MI (US); Ramakrishnan RajaVenkitasubramony, Saginaw, MI (US); Tomy Sebastian, Saginaw, MI (US); Niharika P. Popy, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 110 days.

(21) Appl. No.: 13/804,873

(22) Filed: Mar. 14, 2013

(65) Prior Publication Data

US 2014/0265962 A1 Sep. 18, 2014

(51) Int. Cl.
*H02K 29/06* (2006.01)
*H02P 31/00* (2006.01)
*H02P 6/10* (2006.01)
*H02P 21/00* (2006.01)
*H02P 21/05* (2006.01)
*B62D 5/04* (2006.01)

(52) U.S. Cl.
CPC ............... *H02P 31/00* (2013.01); *B62D 5/046* (2013.01); *H02P 6/10* (2013.01); *H02P 21/0035* (2013.01); *H02P 21/05* (2013.01)

(58) Field of Classification Search
CPC ....... H02P 31/00; H02P 6/10; H02P 21/0035; H02P 21/05; B62D 5/046

USPC ................ 318/400.23, 504, 503, 432, 443, 318/400.02, 400.12
See application file for complete search history.

(56) References Cited

U.S. PATENT DOCUMENTS 4,713,596 A 12/1987 Bose
4,773,149 A 9/1988 Kip et al.
(Continued)

FOREIGN PATENT DOCUMENTS

CN 1675099 A 9/2005
CN 1741368 A 3/2006
(Continued)

OTHER PUBLICATIONS

F. Briz, et al., "Analysis and Design of Current Regulators Using Complex Vectors", IEEE Industry Applications Society Annual Meeting, New Orleans, Louisiana; Oct. 5-9, 1997, pp. 1504-1511.
(Continued)

*Primary Examiner* — Karen Masih
(74) *Attorney, Agent, or Firm* — Cantor Colburn LLP

(57) ABSTRACT

A motor control system for determining a ripple compensating current is provided. The motor control system includes a motor having a plurality of motor harmonics and a motor frequency, and a bandwidth compensation controller that is in communication with the motor. The bandwidth compensation controller is configured to determine a magnitude response compensation value and a phase compensation value for each of the plurality of motor harmonics. The magnitude response compensation value and the phase compensation value are both based on the motor frequency. The bandwidth compensation controller is configured to determine the ripple compensating current based on the magnitude response compensation value and the phase compensation value.

20 Claims, 3 Drawing Sheets

(56) References Cited

U.S. PATENT DOCUMENTS

| | | | |
|---|---|---|---|
| 5,196,778 A | 3/1993 | Hayashida | |
| 5,223,775 A | 6/1993 | Mongeau | |
| 5,410,234 A | 4/1995 | Shibata et al. | |
| 5,652,495 A | 7/1997 | Narazaki et al. | |
| 5,962,999 A | 10/1999 | Nakamura et al. | |
| 6,152,254 A | 11/2000 | Phillips | |
| 6,161,068 A | 12/2000 | Kurishige et al. | |
| 6,222,334 B1 | 4/2001 | Tamagawa et al. | |
| 6,288,515 B1 | 9/2001 | Hiti et al. | |
| 6,370,459 B1 | 4/2002 | Phillips | |
| 6,465,975 B1 | 10/2002 | Naidu | |
| 6,499,559 B2 | 12/2002 | Mc Cann et al. | |
| 6,605,912 B1 | 8/2003 | Bharadwaj et al. | |
| 6,700,342 B2 | 3/2004 | Hampo et al. | |
| 6,900,607 B2 | 5/2005 | Kleinau et al. | |
| 7,034,493 B2 | 4/2006 | Yoshimoto et al. | |
| 7,071,649 B2 | 7/2006 | Shafer et al. | |
| 7,145,310 B2 | 12/2006 | Ihm et al. | |
| 7,199,549 B2 | 4/2007 | Kleinau et al. | |
| 7,207,412 B2 | 4/2007 | Uryu | |
| 7,394,214 B2 | 7/2008 | Endo et al. | |
| 7,576,506 B2 | 8/2009 | Kleinau et al. | |
| 7,952,308 B2 | 5/2011 | Schulz et al. | |
| 8,633,766 B2* | 1/2014 | Khlat et al. | 330/127 |
| 8,896,244 B2 | 11/2014 | Kleinau | |
| 2002/0175649 A1 | 11/2002 | Reutlinger | |
| 2003/0146041 A1 | 8/2003 | Kanda | |
| 2006/0100766 A1 | 5/2006 | Schwarz et al. | |
| 2007/0043490 A1 | 2/2007 | Yokota et al. | |
| 2007/0046126 A1 | 3/2007 | Sagoo et al. | |
| 2007/0103105 A1 | 5/2007 | Endo et al. | |
| 2008/0167779 A1 | 7/2008 | Suzuki | |
| 2009/0026994 A1 | 1/2009 | Namuduri et al. | |
| 2009/0027000 A1 | 1/2009 | Gallegos-Lopez et al. | |
| 2009/0069979 A1 | 3/2009 | Yamashita et al. | |
| 2009/0114470 A1 | 5/2009 | Shimizu et al. | |
| 2009/0234538 A1 | 9/2009 | Ta et al. | |
| 2009/0267555 A1* | 10/2009 | Schulz et al. | 318/432 |
| 2010/0153162 A1 | 6/2010 | Tam et al. | |
| 2011/0175556 A1 | 7/2011 | Tobari et al. | |
| 2012/0112549 A1 | 5/2012 | Perisic et al. | |
| 2012/0221208 A1 | 8/2012 | Kojo et al. | |
| 2013/0261896 A1 | 10/2013 | Gebregergis et al. | |
| 2014/0191699 A1* | 7/2014 | Dixon | 318/503 |
| 2014/0239860 A1 | 8/2014 | Kleinau | |
| 2014/0265961 A1 | 9/2014 | Gebregergis et al. | |
| 2014/0375239 A1 | 12/2014 | Kim et al. | |

FOREIGN PATENT DOCUMENTS

| | | |
|---|---|---|
| CN | 101218146 A | 7/2008 |
| CN | 101399516 A | 4/2009 |
| CN | 101456429 A | 6/2009 |
| CN | 101981804 A | 2/2011 |
| EP | 2003010 A2 | 12/2008 |
| JP | 2000108916 A | 4/2000 |
| JP | 2001247049 A | 9/2001 |

OTHER PUBLICATIONS

European Search Report for related European Application No. 12196930.7, dated: Mar. 22, 2013, 7 pages.

L Harnefors, et al., "Model-Based Current Control of AC Machines Using the Internal Model Control Method", IEEE Transactions on Industry Applications, vol. 34, No. 1, Jan./Feb. 1998, pp. 133-141.

J. Kirtley, "6.061 Introduction to Electric Power Systems, Class Notes Chapter 12 Permanent Magnet 'Brushless DC'" Motors, Massachusetts Institute of Technology, Department of Electrical Engineering and Computer Science, Spring 2011.

Chinese Office Action for Chinese Patent Application No. 201310104183.7 issued on Jan. 6, 2015.

* cited by examiner

MOTOR CONTROL SYSTEM HAVING BANDWIDTH COMPENSATION

BACKGROUND OF THE INVENTION

The present invention relates to a control system for a motor, and more particularly to a control system for a motor that determines a ripple compensating current.

The output torque of a permanent magnet synchronous motor (PMSM) (either a surface permanent magnet (SPM) or an interior permanent magnet (IPM) motor) may be determined by a voltage command and a phase advance angle. A specific output torque of the PMSM is determined by first selecting a specific quadrature axis (also referred to as the q-axis) reference current and a direct axis (also referred to as the d-axis) reference current, and then determining the voltage command and the phase advance angle based on the selected quadrature axis reference current and the direct axis reference current.

Interior permanent magnet synchronous motors (IPMSMs) are relatively inexpensive, but typically produce a relatively high torque ripple during operation. Electric motors utilized in electric power steering (EPS) applications are generally required to produce relatively low torque ripple. Thus, the torque ripple produced by an IPMSM or an SPM may need to be reduced before being used in an EPS application. However, the effects of torque ripple compensation at relatively high motor velocities may be diminished.

SUMMARY OF THE INVENTION

In one embodiment, a motor control system for determining a ripple compensating current is provided. The motor control system includes a motor having a plurality of motor harmonics and a motor frequency, and a bandwidth compensation controller that is in communication with the motor. The bandwidth compensation controller is configured to determine a magnitude response compensation value and a phase compensation value for each of the plurality of motor harmonics. The magnitude response compensation value and the phase compensation value are both based on the motor frequency. The bandwidth compensation controller is configured to determine the ripple compensating current based on the magnitude response compensation value and the phase compensation value.

In another embodiment, a method of determining a ripple compensating current for a motor having a plurality of motor harmonics is provided. The method includes determining a magnitude response compensation value and a phase compensation value for each of the plurality of motor harmonics by a bandwidth compensation controller. The magnitude response compensation value and the phase compensation value are both based on a motor frequency. The method also includes determining the ripple compensating current based on the magnitude response compensation value and the phase compensation value.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
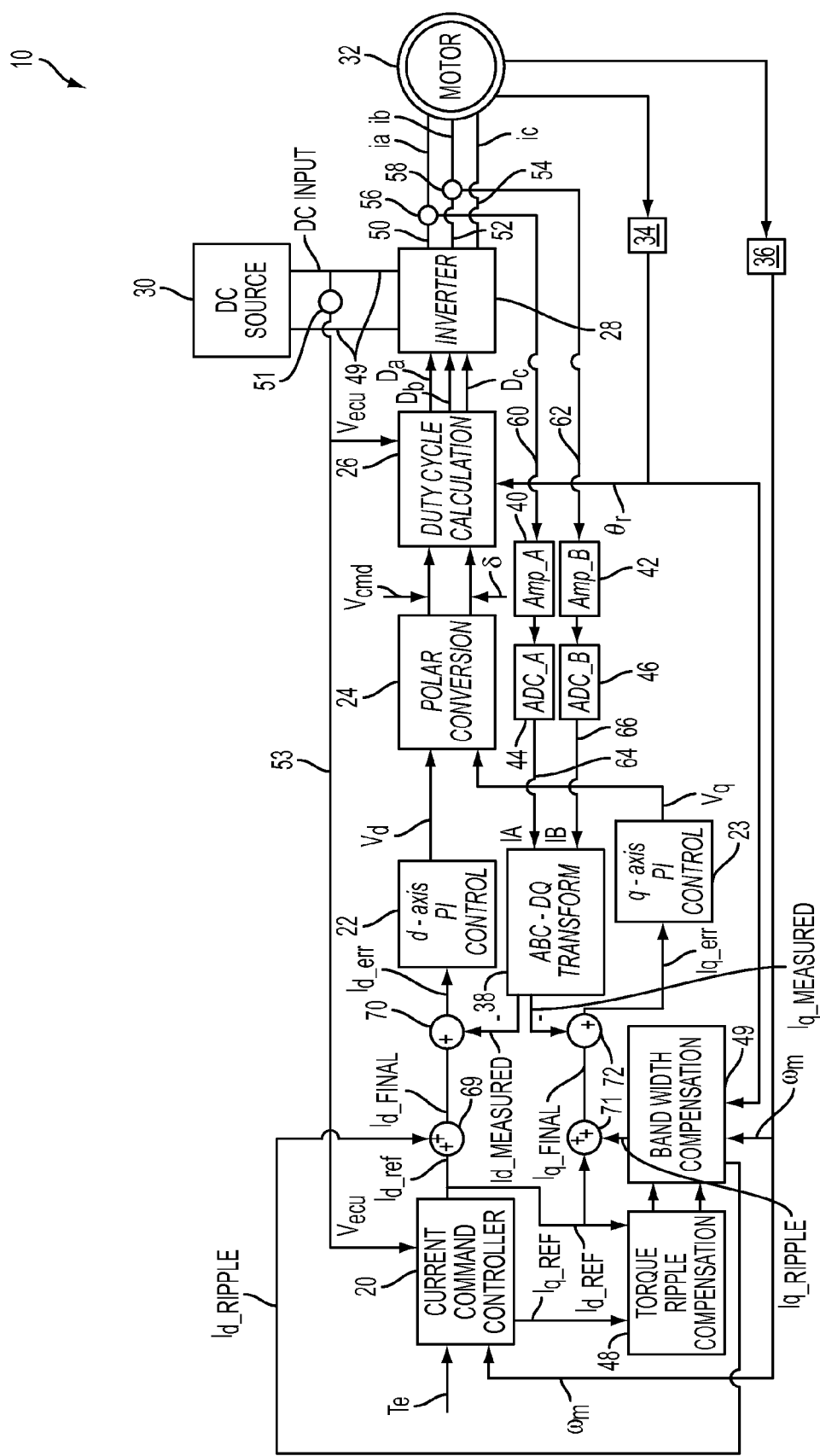
FIG. 1 is a block diagram of a motor control system in accordance with an exemplary embodiment of the invention.

Referring now to the Figures, where the invention will be described with reference to specific embodiments, without limiting same, FIG. 1 is an exemplary block diagram of a motor control system 10. The motor control system 10 includes a command current controller 20, a d-axis proportional plus integral gain (PI) controller 22, a q-axis PI controller 23, a polar conversion controller 24, a pulse width modulation (PWM) inverter controller 26, an inverter 28, a DC power source 30, a motor 32, a position sensor 34, a speed sensor 36, a transform controller 38, an a-axis current amplifier 40, a b-axis current amplifier 42, a a-axis analog to digital converter (ADC) 44, a b-axis ADC 46, a torque ripple compensation controller 48, and a bandwidth compensation controller 49. In one embodiment, the motor 32 may be an interior permanent magnet synchronous motor (IPMSM) or a surface permanent magnet synchronous motor (SPM), however it is to be understood that any type of electric motor that is controlled using phase current may be used as well.

In the embodiment as shown in FIG. 1, the inverter 28 is connected to the DC power source 30, where the DC power source 30 may be, for example, a battery. The DC power source 30 may be connected to the inverter 28 by DC input lines 49. A transducer 51 may be used to monitor a bridge voltage $V_{ecu}$ across the DC input lines 49. A control signal 53 representing the bridge voltage $V_{ecu}$ may be sent to the command current controller 20 and the PWM inverter controller 26. In the exemplary embodiment as shown, the inverter 26 transmits three alternating current (AC) phase currents to the motor 32 (e.g., $i_a$, $i_b$, and $i_c$) by line 50, line 52, and line 54 for operation and control of the motor 32.

For feedback control purposes, the phase currents $i_a$ and $i_b$ transmitted to the motor 32 by lines 50 and 52 may be detected to determine the instantaneous current flow to the motor 32. Specifically, a transducer 56 may be used to monitor the phase current $i_a$ on the line 50, and a transducer 58 may be used to monitor the phase current $i_b$ on the line 52. It should be noted that although transducer 56 and transducer 58 are illustrated, only one of the lines 50 or 52 may be monitored to measure either phase current $i_a$ or phase current $i_b$. A control signal 60 representing the measured phase current $i_a$ may be sent to the a-axis current amplifier 40 from the transducer 56, and a control signal 62 representing the measured phase current $i_b$ may be sent to the b-axis current amplifier 42 from the transducer 58. An augmented or amplified value of the phase current $i_a$ is then sent to the a-axis ADC 44 from the a-axis current amplifier 40, and an amplified value of the phase current $i_b$ 62 is sent to the b-axis ADC 46 from the b-axis current amplifier 42. The a-axis ADC 44 converts the amplified value of the phase current $i_a$ into a digital value 64. The digital value 64 represent the magnitude of the phase current $i_a$. The b-axis ADC 46 converts the amplified value of the phase current $i_b$ into a digital value 66. The digital value 66 represents the magnitude of the phase current $i_b$.

The transform controller 38 receives as input the digital value 64 from the ADC 44 and the digital value 66 from the ADC 46. In one embodiment, the transform controller 38 is a three-phase to two-phase transformation controller where measured values for the AC current (e.g., the digital value 64 representing the phase current $i_a$ and the digital value 66 representing the phase current $i_b$) are converted into equivalent measured currents, which are a measured d-axis current $I_{dMEASURED}$ and a measured q-axis current $I_{qMEASURED}$. The measured d-axis current $I_{dMEASURED}$ is sent to a subtractor 70 and the measured q-axis current $I_{qMEASURED}$ is sent to a subtractor 72.

The command current controller 20 receives as input a torque reference command $T_e$, an angular speed $\omega_m$, and the control signal 53 representing the bridge voltage $V_{ecu}$ from the transducer 51. The torque reference command $T_e$ represents a commanded torque value, and may be derived from another controller (not shown), or may correspond to a torque value generated by an operator. The angular speed $\omega_m$, is measured by the speed sensor 36. The speed sensor 36 may include, for example, an encoder and a speed calculation circuit for calculating the angular speed of a rotor (not shown) of the motor 32 based on a signal received by the encoder. The command current controller 20 calculates a reference d-axis current $I_{d\_REF}$ and a reference q-axis current $I_{q\_REF}$ based on the torque command $T_e$, the bridge voltage $V_{ecu}$, and the angular speed $\omega_m$. For example, in one embodiment, the reference d-axis current $I_{d\_REF}$ and the reference q-axis current $I_{q\_REF}$ may be calculated using a look-up table. However, it is understood other approaches may be used as well to determine the reference d-axis current $I_{d\_REF}$ and the reference q-axis current $I_{q\_REF}$. The reference d-axis current $I_{d\_REF}$ is sent to an adder 69 and the torque ripple compensation controller 48, and the reference q-axis current $I_{q\_REF}$ is sent to an adder 71 and the torque ripple compensation controller 48.

The torque ripple compensation controller 48 receives as input the reference d-axis current $I_{d\_REF}$ and the reference q-axis current $I_{q\_REF}$ from the command current controller 20. The torque ripple compensation controller 48 calculates a current harmonic q-axis magnitude 86 and a current q-axis phase output 88 (shown in FIG. 2) for each motor harmonic. Alternatively, or in addition to the current harmonic q-axis magnitude 86 and a current q-axis phase output 88, the torque ripple compensation controller 48 determines a current harmonic d-axis magnitude 90 and a current d-axis phase output 92 (also shown in FIG. 2) for each motor harmonic. The bandwidth compensation controller 49 may receive as input the current harmonic q-axis magnitude 86, the current q-axis phase output 88, the current harmonic d-axis magnitude 90 and the current d-axis phase output 92 from the torque ripple compensation controller 48. The bandwidth compensation controller 49 also receives a rotor angle value $\theta_r$ measured by the motor position sensor 34, and the angular speed $\omega_m$ measured by the speed sensor 36. The bandwidth compensation controller 49 determines a q-axis ripple compensating current $I_{q\_RIPPLE}$, a d-axis ripple compensating current $I_{d\_RIPPLE}$, or both the a q-axis ripple compensating current $I_{q\_RIPPLE}$ and the d-axis ripple compensating current $I_{d\_RIPPLE}$ based on the inputs, which is described in greater detail below. The q-axis ripple compensating current $I_{q\_RIPPLE}$ and the d-axis ripple compensating current $I_{d\_RIPPLE}$, generate a compensating torque ripple that is substantially equal in magnitude, but is in an opposite direction from a torque ripple generated by the motor 32 (e.g., at about a 180-degree shift).

The adder 69 receives the reference d-axis current $I_{d\_REF}$ and the d-axis ripple compensating current $I_{d\_RIPPLE}$. The adder 69 determines a d-axis final current $I_{d\_final}$ by adding the reference d-axis current $I_{d\_REF}$ and the d-axis ripple compensating current $I_{d\_RIPPLE}$ together. The d-axis final current $I_{d\_final}$ is then sent to the subtractor 70. The subtractor 70 receives the measured d-axis current $I_{dMEASURED}$ and the d-axis final current $I_{d\_final}$. The subtractor 70 determines a d-axis error signal 74 based on the measured d-axis current $I_{dMEASURED}$ and the reference d-axis final current $I_{d\_final}$. The d-axis error signal 74 represents the error between the measured d-axis current $I_{dMEASURED}$ and the d-axis final current $I_{d\_final}$.

The adder 71 receives the reference q-axis current $I_{q\_REF}$ and the q-axis ripple compensating current $I_{q\_RIPPLE}$. The adder 71 determines a q-axis final current $I_{q\_final}$ by adding the reference q-axis current $I_{q\_REF}$ and the q-axis ripple compensating current $I_{q\_RIPPLE}$ together. The q-axis final current $I_{q\_final}$ is then sent to the subtractor 72. The subtractor 72 receives the measured d-axis current $I_{dMEASURED}$ and the q-axis final current $I_{q\_final}$. The subtractor 72 then determines a q-axis error signal 76 based on the measured q-axis current $I_{qMEASURED}$ and the q-axis final current $I_{q\_final}$. The q-axis error signal 76 represents the error between the measured q-axis current $I_{qMEASURED}$ and the q-axis final current $I_{q\_final}$.

The d-axis PI controller 22 receives as input the d-axis error signal 74 from the subtractor 70. The d-axis PI controller 22 calculates a d-axis voltage signal $V_D$. The d-axis voltage signal $V_D$ is based on a d-axis proportional gain $K_P$, and a d-axis integral gain $K_i$. Likewise, the q-axis PI controller 23 receives as input the q-axis error signal 76 from the subtractor 72. The q-axis PI controller 23 calculates a q-axis voltage signal $V_Q$. The q-axis voltage signal $V_Q$ is based on a q-axis proportional gain $K_P$, and a q-axis integral gain $K_i$.

The polar conversion controller 24 receives as input the d-axis voltage signal $V_D$ from the d-axis PI controller 22 and the q-axis voltage signal $V_Q$ from the q-axis PI controller 23. Based on the inputs, the polar conversion controller 24 determines a voltage command $V_{cmd}$ and a phase advance angle $\delta$. The PWM inverter controller 26 receives as inputs the voltage command $V_{cmd}$ and the phase advance angle $\delta$ from the polar conversion controller 24. The PWM inverter controller 26 also receives the rotor angle value $\theta_r$ measured by the motor position sensor 34. In one exemplary embodiment, the PWM inverter controller 26 may include an over-modulation space vector PWM unit to generate three respective duty cycle values $D_a$, $D_b$, and $D_c$. The duty cycle values $D_a$, $D_b$, and $D_c$ are used to drive gate drive circuits (not shown) of the inverter 28 that energize phases of the of the motor 32.

Figure 2:
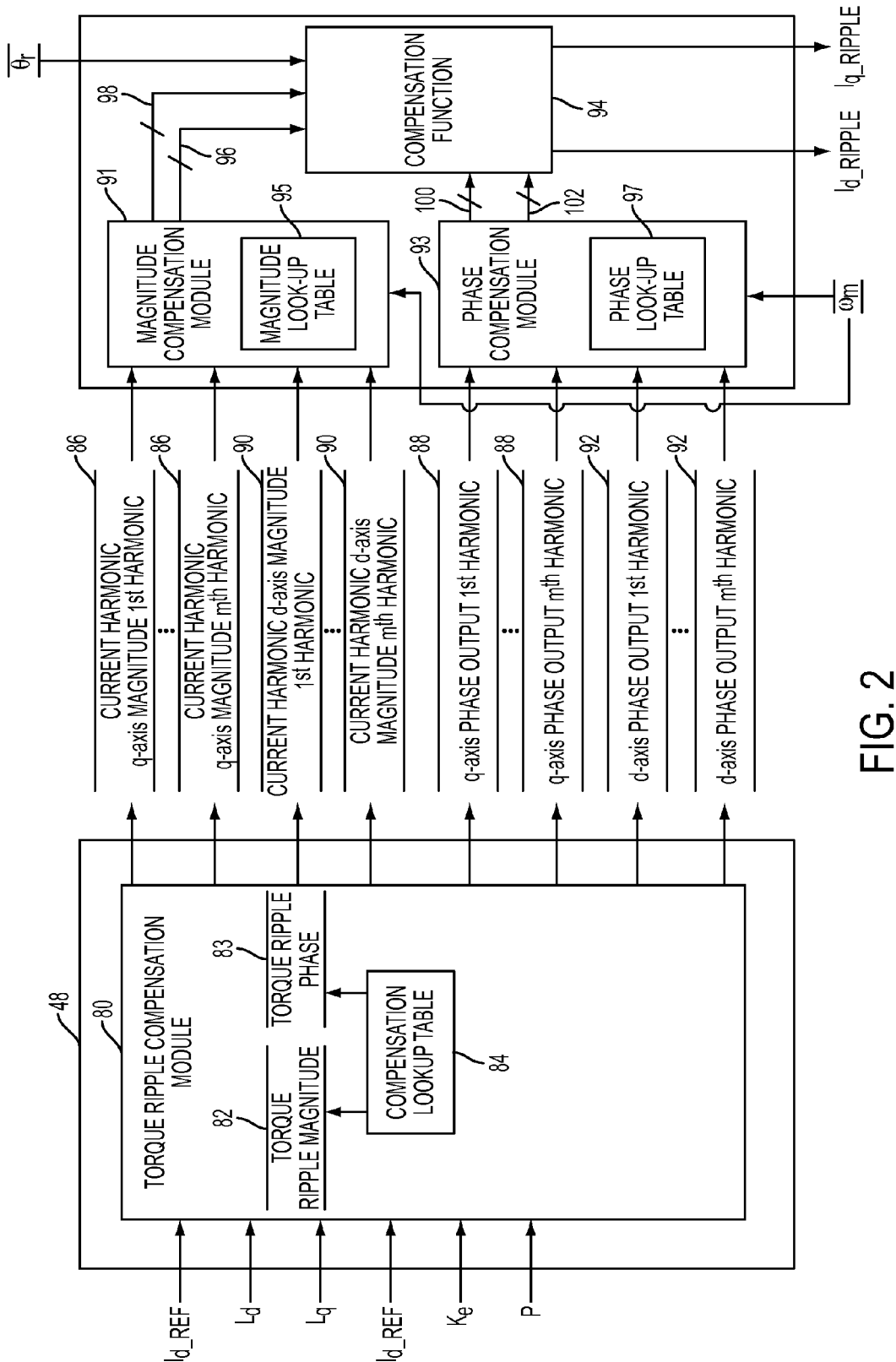
FIG. 2 is a dataflow diagram illustrating an exemplary torque ripple compensation controller and a bandwidth compensation controller, in accordance with another exemplary embodiment of the invention.

Determining the q-axis ripple compensating current $I_{q\_RIPPLE}$ by the torque ripple compensation controller 48 and the bandwidth compensation module 49 will now be described. Turning now to FIG. 2, a dataflow diagram illustrates an exemplary embodiment of the torque ripple compensation controller 48 and the bandwidth compensation module 49 of FIG. 1 used to determine the q-axis ripple current $I_{q\_RIPPLE}$ and the d-axis ripple compensating current $I_{d\_RIPPLE}$. In one example, the torque ripple compensation controller 48 includes a torque ripple compensation module 80. The torque ripple compensation module 80 includes a set of compensation look-up tables 84. Each compensation look-up table 84 contains values for either a torque ripple magnitude 82 or a torque ripple phase 83 for a specific motor harmonic that are based on the reference d-axis current $I_{d\_REF}$ and the reference q-axis current $I_{q\_REF}$.

The torque ripple compensation module 80 receives as input the reference d-axis current $I_{d\_REF}$, the reference q-axis current $I_{q\_REF}$, the motor back-emf constant Ke (where emf is the electromotive force), a number of motor poles P of the motor 32, a q-axis inductance $L_q$, and a d-axis inductance $L_d$. In one alternative embodiment, the torque ripple compensation module may determine the values for the motor back-emf constant Ke, the number of motor pole P, the q-axis inductance $L_q$, and the d-axis inductance $L_d$.

The torque ripple compensation module 80 may first determine the torque ripple magnitude 82 and the torque ripple phase 83 for each motor harmonic using the compensation look-up tables 84. The compensation look-up tables 84 each contain specific values for either the torque ripple magnitude 82 or the torque ripple phase 83 for a specific motor harmonic. The values for the torque ripple magnitude 82 or the torque ripple phase 83 in each of the compensation look-up tables 84 are based on the reference d-axis current $I_{d\_REF}$ and the reference q-axis current $I_{q\_REF}$. For example, to determine the torque ripple magnitude 82 for a specific motor harmonic (e.g., an eighth order motor harmonic), a look-up table is provided to determine the value of the torque ripple magnitude 82 for the eighth order harmonic based on a specific value of the reference d-axis current $I_{d\_REF}$, the reference q-axis current $I_{q\_REF}$. Another look-up table is provided to determine the value of the torque ripple phase 83 for the eighth order harmonic based on a specific value of the reference d-axis current $I_{d\_REF}$, the reference q-axis current $I_{q\_REF}$. In one embodiment, the values for the torque ripple magnitude 82 and the torque ripple phase 83 stored in the compensation look-up tables 84 may be adjusted based on specific cogging torque characteristics of the motor 32 (shown in FIG. 1).

Once the values for the torque ripple magnitude 82 and the torque ripple phase 83 for a specific motor harmonic are found in the compensation look-up tables 84, the torque ripple compensation module 80 may then calculate a current harmonic q-axis magnitude 86 and a current q-axis phase output 88 for the specific motor harmonic. Alternatively, or in addition to the current harmonic q-axis magnitude 86 and the current q-axis phase output 88, the torque ripple compensation module 80 may calculate a current harmonic d-axis magnitude 90 and a current d-axis phase output 92 for the specific motor harmonic. In one embodiment, the current harmonic q-axis magnitude 86 for a specific motor harmonic may be determined by either Equations 1 or 2, the current q-axis phase output 88 for a specific motor harmonic may be determined by Equation 3, the current harmonic d-axis magnitude 90 for a specific motor harmonic may be determined by Equation 4, and the current d-axis phase output 92 for a specific motor harmonic may be determined by Equation 5:

$$\text{MtrCurrQax\_iMag} = \frac{2}{\sqrt{3}} \frac{\text{t\_MtrTrq\_ripple\_iMag}(n)}{Ke} \quad \text{Equation 1}$$

$$\text{MtrCurrQax\_iMag} = \frac{\text{t\_MtrTrq\_ripple\_iMag}(n)}{\frac{\sqrt{3}}{2}Ke + \frac{3}{2}\frac{P}{2}(L_q - L_d)\cdot \text{Id\_ref}} \quad \text{Equation 2}$$

$$\text{MtrCurrQax\_iPhase} = \text{sign}(\text{Iq\_ref})\text{t\_MtrTrq\_ripple\_iPh}(n) \quad \text{Equation 3}$$

$$\text{MtrCurrDax\_iMag} = \frac{\text{t\_MtrTrq\_ripple\_iMag}(n)}{\frac{3}{2}\frac{P}{2}(L_q - L_d)\cdot \text{Iq\_ref}} \quad \text{Equation 4}$$

$$\text{MtrCurrDax\_iPhase} = \text{sign}(\text{Iq\_ref})\text{t\_MtrTrq\_ripple\_iPh}(n) \quad \text{Equation 5}$$

where MtrCurrQax_iMag is the current harmonic q-axis magnitude 86, t_MtrTrq_ripple_iMag(n) is the torque ripple magnitude 82 found in one of the compensation look-up tables 84 for an $i^{th}$ harmonic (where i represents a specific harmonic such as, for example, the eighth harmonic), MtrCurrQax_iPhase is the current q-axis phase output 88, t_MtrTrq_ripple_iPh(n) is the torque ripple phase 83 found in one of the compensation look-up tables 84 for the $i^{th}$ harmonic, MtrCurrDax_iMag is the current harmonic d-axis magnitude 90, and MtrCurrDax_iPhase is the current d-axis phase output 92.

The torque ripple compensation module 80 calculates the current harmonic q-axis magnitude 86 and the current q-axis phase output 88 for each motor harmonic. For example, as seen in FIG. 2, if there are an m number of motor harmonics, then the torque ripple compensation module 80 calculates the m number of values of the current harmonic q-axis magnitude 86 and an m number of values for the current q-axis phase output 88. Alternatively, or in addition to the current harmonic q-axis magnitude 86 and the current q-axis phase output 88, the torque ripple compensation module 80 calculates the current harmonic d-axis magnitude 90 and the current d-axis phase output 92 for each motor harmonic (e.g., the m number of motor harmonics).

The bandwidth compensation module 49 includes a magnitude compensation module 91, a phase compensation module 93, and a ripple compensation block 94. The magnitude compensation module 91 receives as input from the torque ripple compensation module 80 the m number of values of the current harmonic q-axis magnitude 86. Alternatively, or in addition to the m number of values of the current harmonic q-axis magnitude 86, the magnitude compensation module 91 receives as input from the torque ripple compensation module 80 the m number of values of the current harmonic d-axis magnitude 90. The magnitude compensation module 91 also receives as input the angular speed $\omega_m$, (from the speed sensor 36 shown in FIG. 1). The magnitude compensation module 91 determines a q-axis magnitude response compensation value 96 for an $i^{th}$ harmonic. Alternatively, or in addition to the q-axis magnitude response compensation value 96, the magnitude compensation module 91 determines a d-axis magnitude response compensation value 98 for an $i^{th}$ harmonic. Specifically, the magnitude compensation module 91 first determines a frequency compensation value n for an $i^{th}$ harmonic using Equation 6:

$$n = i * \frac{P}{2}\omega_m \quad \text{Equation 6}$$

The magnitude compensation module 91 may then determine a PI compensating magnitude based on the frequency compensation value n. The PI compensating magnitude is a unitless gain value for a specific motor harmonic. In one embodiment, the magnitude compensation module 91 includes a magnitude look-up table 95, where a specific value of the PI compensating magnitude is selected based on the frequency compensation value n. The magnitude compensation module 91 may then determine the magnitude response compensation value 96 using Equations 6 and 7, and the d-axis magnitude response compensation value 98 using Equations 6 and 8:

MtrCurrPI_iMag_Qax=
t_MtrCurrPIComp_iMag(n)*MtrCurrQax_IMag   Equation 7

MtrCurrPI_iMag_Dax=
t_MtrCurrPIComp_iMag(n)*MtrCurrDax_iMag   Equation 8 where MtrCurrPI_iMag_Qax is the q-axis magnitude response compensation value 96, MtrCurrQax_iMag is the current harmonic q-axis magnitude 86 for an $i^{th}$ harmonic, t_MtrCurrPIComp_iMag(n) is the PI compensating magnitude an $i^{th}$ harmonic, MtrCurrPI_iMag_Dax is the d-axis magnitude response compensation value 98, MtrCurrDax_iMag is the current harmonic d-axis magnitude 90 for an $i^{th}$ harmonic.

The magnitude compensation module 91 calculates the q-axis magnitude response compensation value 96, the d-axis magnitude response compensation value 98, or both the q-axis magnitude response compensation value 96 and the d-axis magnitude response compensation value 98 for each motor harmonic (e.g., the m number of motor harmonics).

The phase compensation module 93 receives as input from the torque ripple compensation module 80 the m number of values for the current q-axis phase output 88 and the m number of values for the torque ripple phase 83. Alternatively, or in addition to the m number of values of the current q-axis phase output 88, the phase compensation module 93 receives as input from the torque ripple compensation module 80 the m number of values for the current d-axis phase output 92. The phase compensation module 93 also receives as input the angular speed $\omega_m$. The phase compensation module 93 determines a q-axis phase compensation value 100 for an $i^{th}$ harmonic. Alternatively, or in addition to the q-axis phase compensation value 100, the phase compensation module 93 determines a d-axis phase compensation value 102 for an $i^{th}$ harmonic. Specifically, the phase compensation module 93 first determines a frequency compensation value n for an $i^{th}$ harmonic using Equation 6, which is described above.

The phase compensation module 93 may then determine a PI compensating phase based on the frequency compensation value n. The PI compensating phase is a phase in degrees for a specific motor harmonic. In one embodiment, the phase compensation module 93 includes a phase look-up table 97, where a specific value of the PI compensating phase is selected based on the frequency compensation value n. The phase compensation module 93 may then determine the q-axis phase compensation value 100 using Equations 8, and the d-axis phase compensation value 102 using Equation 9:

$$\text{MtrCurrPI\_iPh\_Qax} = t\_\text{MtrCurrPIComp\_iPh}(n) + \text{MtrCurrQax\_IPh} \quad \text{Equation 8}$$

$$\text{MtrCurrPI\_iPh\_Dax} = t\_\text{MtrCurrPIComp\_iPh}(n) + \text{MtrCurrDax\_IPh} \quad \text{Equation 9}$$

where MtrCurrPI_iPh_Qax is the q-axis phase compensation value 100, MtrCurrQax_IPh is the q-axis current harmonic q-axis phase 88 for an $i^{th}$ harmonic, t_MtrCurrPIComp_iPh(n) is the PI compensating phase an $i^{th}$ harmonic, MtrCurrPI_iPh_Dax is the d-axis phase compensation value 102, MtrCurrDax_IPh is the current d-axis phase output 92 for an $i^{th}$ harmonic.

The phase compensation module 93 calculates the q-axis phase response compensation value 100, the d-axis phase response compensation value 102, or both the q-axis phase response compensation value 100 and the d-axis phase response compensation value 102 for each motor harmonic (e.g., the m number of motor harmonics).

The ripple compensation block 94 receives as input the m number of values of the magnitude response compensation value 96, the d-axis magnitude response compensation value 98, or both, from the magnitude compensation module 91. The ripple compensation block 94 also receives as input the m number of values of the q-axis phase response compensation value 100, the d-axis phase response compensation value 102, or both the q-axis phase response compensation value 100 and the d-axis phase response compensation value 102 from the from the phase compensation module 93. The ripple compensation module 94 also receives the rotor angle value $\theta_r$ measured by the motor position sensor 34. The ripple compensation block 94 determines the q-axis ripple compensating current $I_{q\_RIPPLE}$ based on the q-axis magnitude response compensation values 96, the q-axis phase compensation values 98, and the rotor angle value $\theta_r$. In one embodiment, the q-axis ripple compensating current $I_{q\_RIPPLE}$ is determined by Equation 10:

$$I_{q\_RIPPLE} = \sum_{i=1}^{m} \text{MtrCurrPI\_iMag\_Qax} * \sin(i\theta + \text{MtrCurrPI\_iPh\_Qax}) \quad \text{Equation 10}$$

The ripple compensation block 94 determines the d-axis ripple compensating current $I_{d\_RIPPLE}$ based on the d-axis magnitude response compensation values 100, the d-axis phase compensation values 102, and the rotor angle value $\theta_r$. In one embodiment, the d-axis ripple compensating current $I_{d\_RIPPLE}$ is determined by Equation 11:

$$I_{d\_RIPPLE} = \sum_{i=1}^{m} \text{MtrCurrPI\_iMag\_Dax} * \sin(i\theta + \text{MtrCurrPI\_iPh\_Dax}) \quad \text{Equation 11}$$

The q-axis ripple compensating current $I_{q\_RIPPLE}$ is then sent to the adder 71 (shown in FIG. 1), and the d-axis ripple compensating current $I_{d\_RIPPLE}$ is sent to the adder 69 (shown in FIG. 1).

Figure 3:
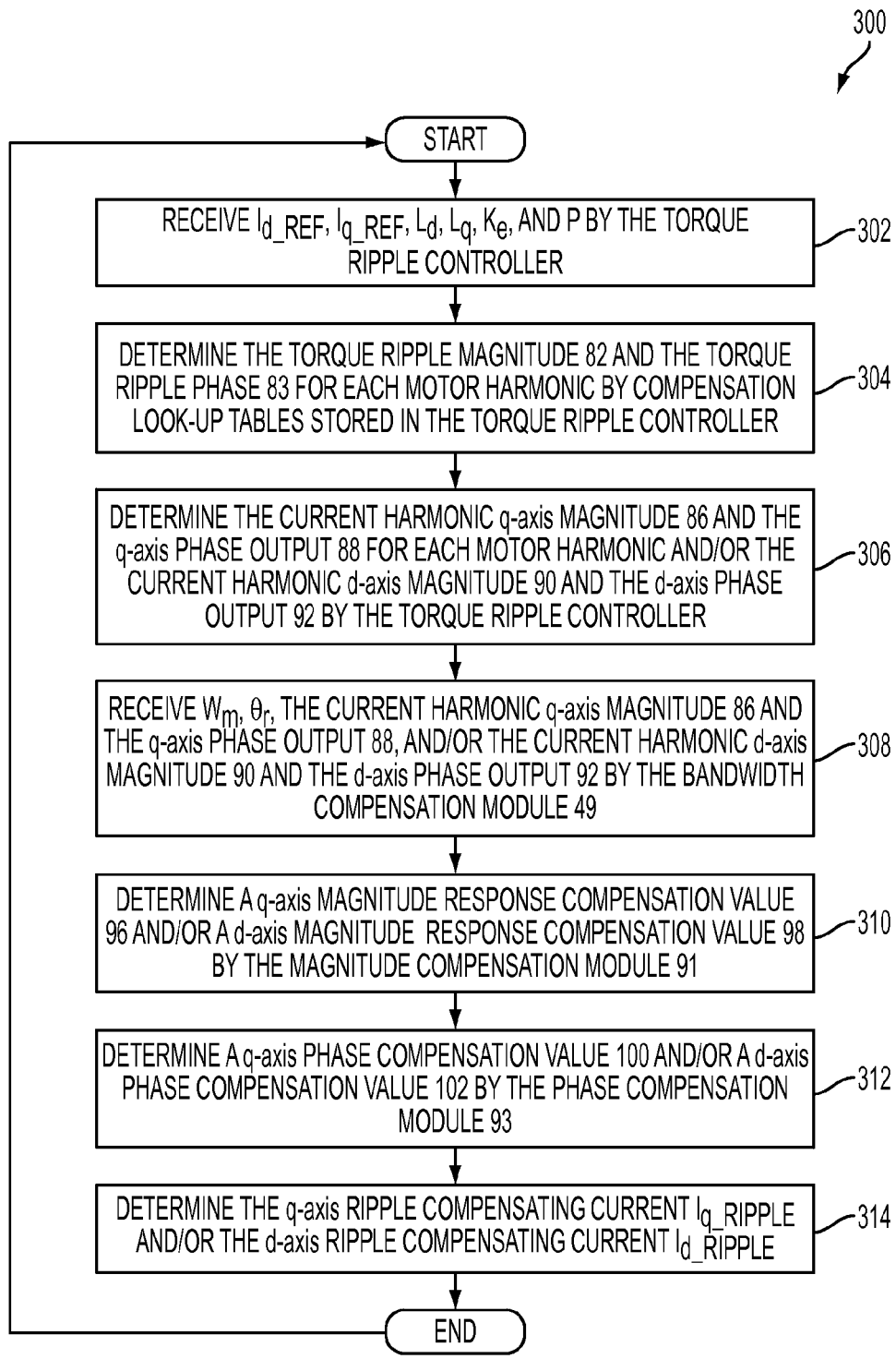
FIG. 3 is a process flow diagram for determining a ripple compensating current, in accordance with yet another exemplary embodiment of the invention.

FIG. 3 is an exemplary process flow diagram illustrating a method 300 for determining the q-axis ripple compensating current $I_{q\_RIPPLE}$ and the d-axis ripple compensating current $I_{d\_RIPPLE}$. Referring now to FIGS. 1-3, the method 300 may begin at block 302, where the torque ripple compensation controller 48 receives as input the reference d-axis current $I_{d\_REF}$, the reference q-axis current $I_{q\_REF}$, the motor back-emf constant Ke, the rotor angle value $\theta_r$, the number of motor poles P, the q-axis inductance $L_q$, and the d-axis inductance $L_d$. In one embodiment, the torque compensation controller 48 periodically determine the motor back-emf constant Ke, the rotor angle value $\theta_r$, the number of motor poles P, the q-axis inductance $L_q$, and the d-axis inductance $L_d$. Method 200 may then proceed to block 304.

In block 304, the torque ripple compensation controller 48 determines the torque ripple magnitude and the torque ripple phase for each motor harmonic using the compensation look-up tables 84 based on the values of the reference d-axis current $I_{d\_REF}$ and the reference q-axis current $I_{q\_REF}$. Method 300 may then proceed to block 306.

In block 306, the torque ripple compensation controller 48 may then calculate the current harmonic q-axis magnitude 86 and the current q-axis phase output 88 for each motor harmonic using Equations 1-3. Alternatively, or in addition to the current harmonic q-axis magnitude 86 and the current q-axis phase output 88, the torque ripple compensation controller 48 determines the current harmonic d-axis magnitude 90 and the current d-axis phase output 92 for each motor harmonic using Equations 4-5. Method 300 may then proceed to block 308.

In block 308, the bandwidth compensation module 49 receives as input the m number of values of the current harmonic q-axis magnitude 86, the q-axis phase output 88 the rotor angle value $\theta_r$ measured by the motor position sensor 34, and the angular speed $\omega_m$. Alternatively, or in addition to the m number of values of the current harmonic q-axis magnitude 86 and the q-axis phase output 88, the bandwidth compensation module 49 receives as input the m number of values of the current harmonic d-axis magnitude 90 and the d-axis phase output 92. Method 300 may then proceed to block 310.

In block 310, the magnitude compensation module 91 determines the q-axis magnitude response compensation value 96 for an $i^{th}$ harmonic. Alternatively, or in addition to the q-axis magnitude response compensation value 96, the magnitude compensation module 91 determines the d-axis magnitude response compensation value 98 for an $i^{th}$ harmonic. In one embodiment, the magnitude response compensation value 96 is determined using Equations 6 and 7 (described above), and the d-axis magnitude response compensation value 98 is determined using Equations 6 and 8 (described above). Method 300 may then proceed to block 312.

In block 312, the phase compensation module 93 determines the q-axis phase compensation value 100 for an $i^{th}$ harmonic. Alternatively, or in addition to the q-axis phase compensation value 100, the phase compensation module 93 determines the d-axis phase compensation value 102 for an $i^{th}$ harmonic. In one embodiment, the q-axis phase compensation value 100 is determined using Equations 6 and 8 (described above), and the d-axis phase compensation value 102 is determined using Equation 6 and Equation 9 (described above). Method 300 may then proceed to block 314.

In block 314, the ripple compensation block 94 determines the q-axis ripple compensating current $I_{q\_RIPPLE}$. In one embodiment, the q-axis ripple compensating current $I_{q\_RIPPLE}$ is determined by Equation 10 (described above). Alternatively, or in addition to the q-axis ripple compensating current $I_{q\_RIPPLE}$, the ripple compensation block 84 determines the d-axis ripple compensating current $I_{d\_RIPPLE}$. In one embodiment, the d-axis ripple compensating current $I_{d\_RIPPLE}$ is determined by Equation 11 (described above). Method 300 may then terminate, or return to block 302.

The bandwidth compensation controller 49 as described above determines the q-axis ripple compensating current $I_{q\_RIPPLE}$, the d-axis ripple compensating current $I_{d\_RIPPLE}$, or both the q-axis ripple compensating current $I_{q\_RIPPLE}$ and the d-axis ripple compensating current $I_{d\_RIPPLE}$ using a bandwidth compensation approach. In particular, the bandwidth compensation approach will broaden or increase the bandwidth of a closed-loop q-axis current and a closed loop d-axis current of PI control. The q-axis ripple compensating current $I_{q\_RIPPLE}$ and the d-axis ripple compensating current $I_{d\_RIPPLE}$ are configured to compensate for torque ripple created by the motor 32 at relatively high motor velocities by producing a torque ripple that is substantially equal in magnitude, but is in an opposite direction from the torque ripple generated by the motor 32, which cancels the torque ripple created by the motor 32. In addition to reducing torque ripple at relatively high motor velocities, airborne and structural noise created by the motor 32 at relatively high velocities will also be reduced or substantially eliminated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A motor control system for determining, comprising:
   a motor having a plurality of motor harmonics and a motor frequency; and
   a bandwidth compensation controller in communication with the motor, the bandwidth compensation controller configured to:
   determine a magnitude response compensation value and a phase compensation value for each of the plurality of motor harmonics, the magnitude response compensation value and the phase compensation value both based on the motor frequency; and
   determine a ripple compensating current based on the magnitude response compensation value and the phase compensation value.

2. The motor control system of claim 1, wherein the ripple compensating current is a q-axis ripple compensating current, and determined by:

$$I_{q\_RIPPLE} = \sum_{i=1}^{m} \text{MtrCurrPI\_iMag\_Qax} * \sin(i\theta + \text{MtrCurrPI\_iPh\_Qax})$$

wherein $I_{q\_RIPPLE}$ is the q-axis ripple compensating current, MtrCurrPI_iMag_Qax is a q-axis magnitude response compensation value, i represents a specific one of the plurality of motor harmonics, θ is a rotor angle value of the motor, and MtrCurrPI_iPh_Qax is a q-axis phase compensation value.

3. The motor control system of claim 1, wherein the ripple compensating current is a d-axis ripple compensating current, and determined by:

$$I_{d\_RIPPLE} = \sum_{i=1}^{m} \text{MtrCurrPI\_iMag\_Dax} * \sin(i\theta + \text{MtrCurrPI\_iPh\_Dax})$$

wherein $I_{d\_RIPPLE}$ is the d-axis ripple compensating current, MtrCurrPI_iMag_Dax is a d-axis magnitude response compensation value, i represents a specific one of the plurality of motor harmonics, θ is a rotor angle value of the motor, and MtrCurrPI_iPh_Dax is a d-axis phase compensation value.

4. The motor control system of claim 1, further comprising a torque ripple compensation controller in communication with the bandwidth compensation controller, wherein the torque ripple compensation controller includes a plurality of look-up tables.

5. The motor control system of claim 4, wherein each of the plurality of look-up tables are used to determine one of a torque ripple magnitude and a torque ripple phase for one of the plurality of motor harmonics.

6. The motor control system of claim 5, wherein the torque ripple compensation controller calculates a current harmonic magnitude based on the torque ripple magnitude.

7. The motor control system of claim 6, wherein the magnitude response compensation value is based on the current harmonic magnitude and a frequency compensation value.

8. The motor control system of claim 5, wherein the torque ripple compensation controller calculates a phase output based on the torque ripple phase.

9. The motor control system of claim 8, wherein the phase compensation value is based on the phase output and a frequency compensation value.

10. The motor control system of claim 1, wherein the bandwidth compensation controller determines a frequency compensation value for an $i^{th}$ motor harmonic by:

$$n = i * \frac{P}{2}\omega_m$$

wherein n represents the frequency compensation value for the $i^{th}$ harmonic, i represents a specific motor harmonic, P represents a number of poles of the motor, and $\omega_m$, represents the motor frequency.

11. A method of motor control for a motor having a plurality of motor harmonics, comprising:
   determining a magnitude response compensation value and a phase compensation value for each of the plurality of motor harmonics by a bandwidth compensation controller, the magnitude response compensation value and the phase compensation value both based on a motor frequency; and
   determining a ripple compensating current based on the magnitude response compensation value and the phase compensation value.

12. The method of claim 11, wherein the ripple compensating current is a q-axis ripple compensating current, and determined by:

$$I_{q\_RIPPLE} = \sum_{i=1}^{m} \text{MtrCurrPI\_iMag\_Qax} * \sin(i\theta + \text{MtrCurrPI\_iPh\_Qax})$$

wherein $I_{q\_RIPPLE}$ is the q-axis ripple compensating current, MtrCurrPI_iMag_Qax is a q-axis magnitude response compensation value, i represents a specific one of the plurality of motor harmonics, θ is a rotor angle value of the motor, and MtrCurrPI_iPh_Qax is a q-axis phase compensation value.

13. The method of claim 11, wherein the ripple compensating current is a d-axis ripple compensating current, and determined by:

$$I_{d\_RIPPLE} = \sum_{i=1}^{m} \text{MtrCurrPI\_iMag\_Dax} * \sin(i\theta + \text{MtrCurrPI\_iPh\_Dax})$$

wherein $I_{d\_RIPPLE}$ is the d-axis ripple compensating current, MtrCurrPI_iMag_Dax is a d-axis magnitude response compensation value, i represents a specific one of the plurality of motor harmonics, θ is a rotor angle value of the motor, and MtrCurrPI_iPh_Dax is a d-axis phase compensation value.

14. The method of claim 11, further comprising providing a torque ripple compensation controller in communication with the bandwidth compensation controller, wherein the torque ripple compensation controller includes a plurality of look-up tables.

15. The method of claim 14, wherein each of the plurality of look-up tables are used to determine one of a torque ripple magnitude and a torque ripple phase for one of the plurality of motor harmonics.

16. The method of claim 15, wherein the torque ripple compensation controller calculates a current harmonic magnitude based on the torque ripple magnitude.

17. The method of claim 16, wherein the magnitude response compensation value is based on the current harmonic magnitude and a frequency compensation value.

18. The method of claim 15, wherein the torque ripple compensation controller calculates a phase output based on the torque ripple phase.

19. The method of claim 18, wherein the phase compensation value is based on the phase output and a frequency compensation value.

20. The method of claim 11, further comprising determining a frequency compensation value for an $i^{th}$ motor harmonic by:

$$n = i * \frac{P}{2}\omega_m$$

wherein n represents the frequency compensation value for the $i^{th}$ harmonic, i represents a specific motor harmonic, P represents a number of poles of the motor, and $\omega_m$ represents the motor frequency.

* * * * *